UNITED STATES PATENT OFFICE.

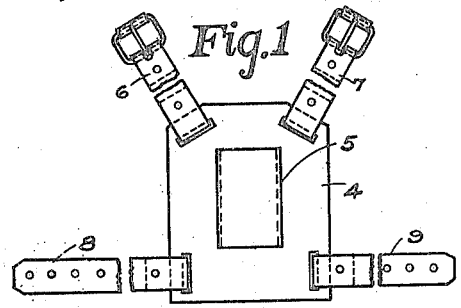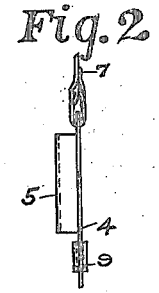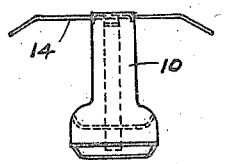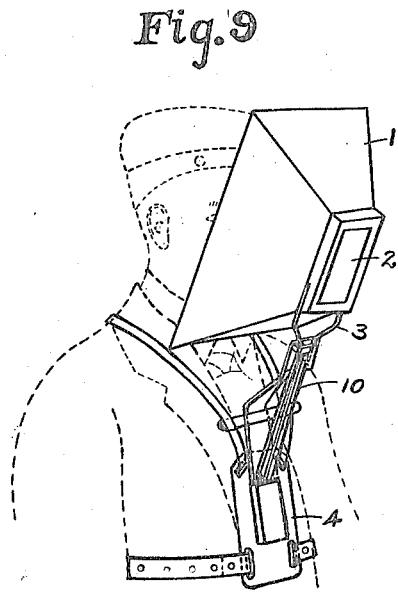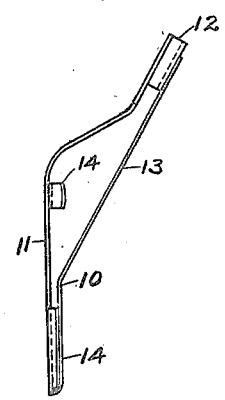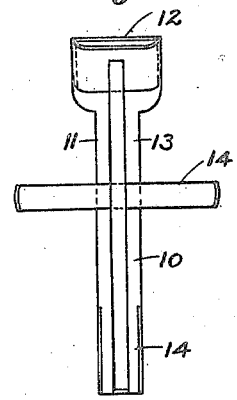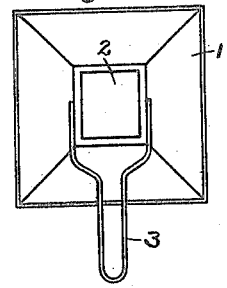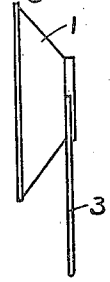

CHARLES B. WADE AND ERNEST K. HERMAN, OF ROANOKE, VIRGINIA.

ELECTRIC-WELDING SHIELD.

1,255,249.  Specification of Letters Patent.  Patented Feb. 5, 1918.

Application filed June 2, 1917. Serial No. 172,444.

*To all whom it may concern:*

Be it known that we, CHARLES B. WADE and ERNEST K. HERMAN, citizens of the United States, residing at Roanoke, in the county of Roanoke and State of Virginia, have invented certain new and useful Improvements in Electric-Welding Shields, of which the following is a specification.

This invention relates to shields for electric welders or oxy-acetylene operators and has for its object to provide means for supporting shields of this character upon the body of the operator. The invention consists of the formation, combination and arrangement of parts as will be herein described and claimed.

In the drawings, Figure 1 is a front elevation of the breastplate as employed in the embodiment of our invention, Fig. 2 a side elevational view of the same, and Fig. 3 an inverted plan view thereof. Fig. 4 is a side elevational view of the angular shield holder or extension and Figs. 5 and 6 are front elevational and plan views respectively of the same. Figs. 7 and 8 are front and side elevational views of the shield which it is contemplated will be used with the present holding means. Fig. 9 is a perspective view showing the several parts assembled and in position on an operator.

Referring now to these drawings, 1 represents a welding shield of customary form having a sight aperture 2 which is covered by the usual colored glass plates and having a handle 3 extending below one edge of the shield. These shields, as is well known in the art, are used to protect the face and neck of the operator from the effects of the rays given off in welding or cutting.

It has been customary to hold this shield or pan in one hand and use the other hand for directing the welding or cutting point. The present invention provides means for supporting this pan from the shoulders and against the breast of the operator, leaving both hands free for use in the operations.

The supporting arrangement consists of a breastplate 4 having a vertically disposed pocket 5 on its front face, this pocket being open at least at its upper end. At the corners of the breastplate straps 6, 7, 8 and 9 are secured, the upper straps 6 and 7 carrying buckles at their outer ends and the lower straps 8 and 9 having openings in their ends for the tongues of the buckles. This plate is worn by the operator on his breast, the straps 6 and 7 passing over the shoulders and the straps 8 and 9 passing around the chest, the strap 8 connecting with the buckle of the strap 7 and the strap 9 with the buckle of the strap 6, the straps crossing on the back of the wearer.

The handle 3 of the pan may be inserted directly in the pocket 5 but in order to position the pan properly over the face of the wearer there is provided an angular pan holder 10 which consists of a flat strip of metal 11 extending substantially vertically for a portion of its length and then being bent outwardly near its upper end. At the top there is affixed to this metal strip a pocket 12 adapted to receive the handle 3 of the pan, this pocket being set at an outwardly inclined angle and being open at its top. From this pocket a brace 13 extends downwardly and rearwardly to the strip 11, and the lower ends of the strip 11 and of the brace 10 are fashioned at 14 to enter the pocket 5 of the breastplate. A cross bar 14 is attached to the strip 11 and the straps 6 and 7 pass over the ends of this cross bar the better to support the assembled device. With the several parts of the device constructed, assembled and worn as already set forth the pan will be positioned directly in front of the operator's face and will allow him the free use of both hands. And the arrangement and construction of the parts are such that they will not interfere with the operations.

It will be understood that the drawings show the preferred embodiment of this invention. Other embodiments are possible within the scope of the appended claims without departing from the spirit of the invention.

What is claimed is:

1. In a supporting device for welding shields, a plate and means for securing the same to the wearer's body, said plate having an open-top pocket upon its front face, the same being adapted to accommodate a coöperating extension from the shield.

2. In a supporting device for welding shields, a plate, means for securing the same upon the wearer's breast, and an extension detachably attached to said plate and extending upwardly and outwardly and having at its upper extremity means for the attachment thereto of the shield.

3. In electric welding, a pan shaped shield having a glass-covered sight aperture in its front face, a handle extending downwardly from the shield, and means for supporting the shield upon the wearer's breast, said means embodying a breastplate, connected straps extending therefrom and passing over the shoulders and around the body of the wearer, an open top pocket on the front face of the breast plate, an upward extension detachably secured in said pocket, and means at the upper end of the said extension for detachably engaging the handle of the said pan.

4. In a supporting device for welding shields, a breast-plate, straps extending therefrom over the wearer's shoulders and adapted to support the same, an upward extension from the breastplate carrying said shield at its upper end, and a cross bar on the said extension above the breastplate, the ends of the said cross bar being disposed beneath the shoulder straps.

In testimony whereof we affix our signatures.

CHARLES B. WADE.
ERNEST K. HERMAN.

Copies of this patent may be obtained for five cents each, by addressing the "Commissioner of Patents, Washington, D. C."